United States Patent [19]

Stratton

[11] Patent Number: 5,693,882
[45] Date of Patent: Dec. 2, 1997

[54] FORCE SENSING DEVICE HAVING BREAKOUT TABS

[75] Inventor: Thomas G. Stratton, Roseville, Minn.

[73] Assignee: Honeywell Inc., Minneapolis, Minn.

[21] Appl. No.: 607,499

[22] Filed: Feb. 27, 1996

[51] Int. Cl.⁶ .................................................... G01P 15/13
[52] U.S. Cl. ............................ 73/514.16; 73/514.35
[58] Field of Search ............................ 73/488, 514.01, 73/514.16, 514.34, 514.35, 514.39

[56] References Cited

U.S. PATENT DOCUMENTS

| | | | |
|---|---|---|---|
| 4,498,342 | 2/1985 | Aske | 73/517 B |
| 5,092,172 | 3/1992 | Overman et al. | 73/514.01 |
| 5,205,171 | 4/1993 | O'Brien et al. | 73/514.18 |
| 5,275,048 | 1/1994 | Hulsing, II et al. | 73/514.01 |
| 5,503,285 | 4/1996 | Warren | 73/514.29 |

Primary Examiner—Richard Chilcot
Assistant Examiner—Max H. Noori
Attorney, Agent, or Firm—Gregory A. Bruns

[57] ABSTRACT

A force sensing component for use with a force sensing unit includes a planar flexure member having a moveable portion separated from a fixed portion by a strain sensitive connection and a removable tab partially defined by through cuts along a crystallographic axis of the flexure member. Upper and lower stops limit movement of the beam.

9 Claims, 7 Drawing Sheets

Crystallographic Axes

Fig. 8

FORCE SENSING DEVICE HAVING BREAKOUT TABS

BACKGROUND OF THE INVENTION

The present invention relates generally to accelerometers and specifically to accelerometers for applications requiring higher short term sensitivity and faster response times than is typical of, for example, inertial navigation applications.

The higher short term sensitivity and faster response time are needed for particular applications. One example of such a need is in seismic exploration. In this geophysical method of determining subsurface geologic structure, energy, typically in the form of an explosion is introduced into the ground. The energy encounters physical discontinuities in the subsurface structure and is partially reflected back to the surface where it is detected and recorded using sensitive vibration detecting devices called geophones.

The high sensitivity required in this and other applications requires that silicon based force sensing devices have very thin, fragile sensing elements.

It has been proposed to use supporting tabs in a silicon based sensor device to prevent breakage until certain processing steps are completed, and then to remove the tabs in a laser scribe operation. The problems with a laser scribe operation include the fact that it spreads molten material around and that it is an expensive operation.

Thus a need exists for a highly sensitive force sensing component that can be manufactured in high volumes and at low cost for use in geophones and in other applications requiring a force sensing component.

SUMMARY OF THE INVENTION

The present invention solves these and other needs by providing a force sensing component for use in a force sensing unit such as an accelerometer. The force sensing component includes a planar flexure member having a fixed portion and a moveable portion with a strain sensitive connection between the portion for providing an output. Upper and lower stops limit movement of the moveable portion. At least one removable tab extends between the portion and the tab is partially defined by through-cuts along a crystallographic axis of the flexure member.

DETAILED DESCRIPTION OF THE INVENTION

Figure 1:
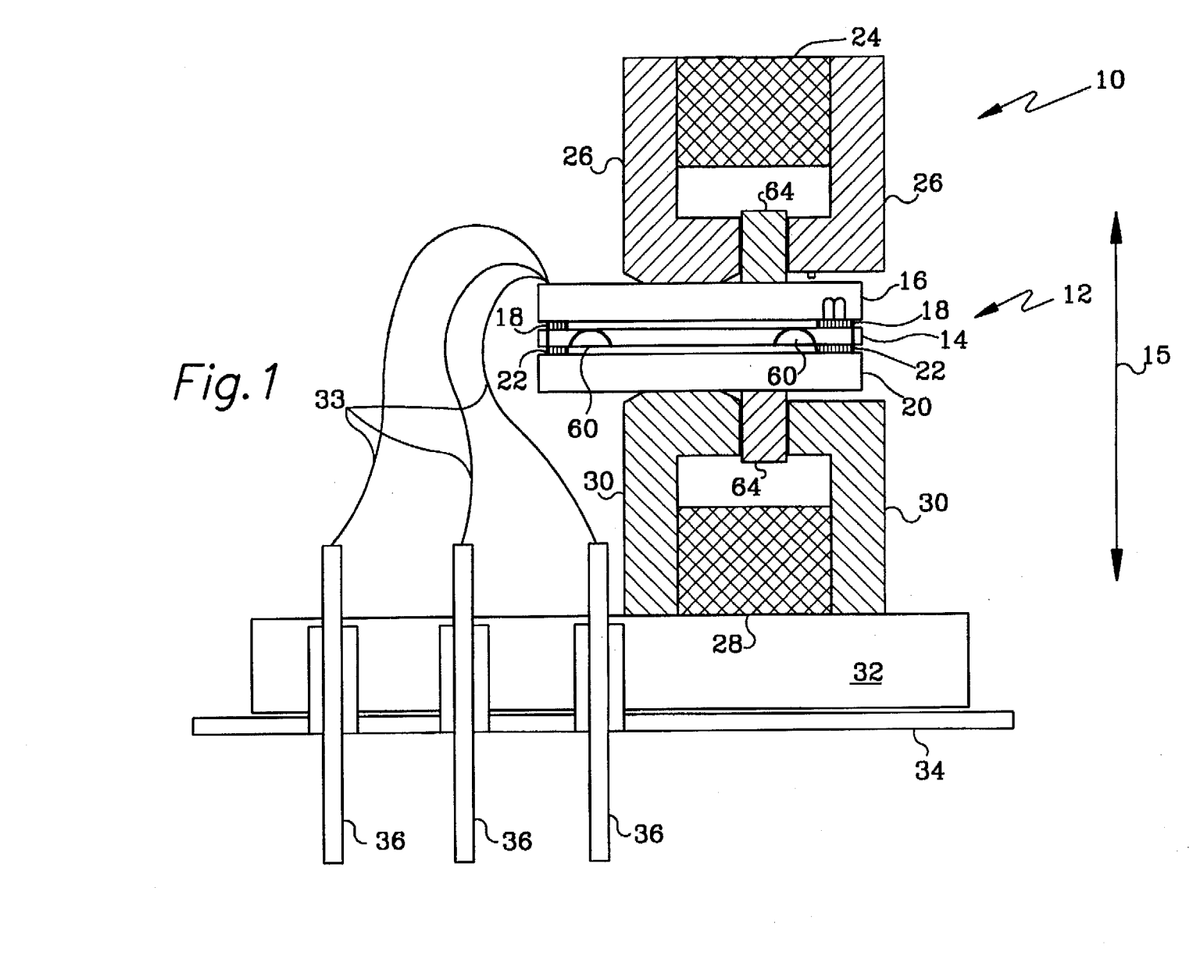
FIG. 1 is a sectional view of a force sensing unit in accordance with the principles of the present invention.

Referring to FIG. 1, a force sensing unit or accelerometer 10 for sensing force in a direction of axis 15 is shown including a force sensing component or sensor capsule 12. Sensor capsule 12 includes a central planar flexure member 14, an upper stop 16 secured to an upper surface of flexure member 14 by adhesive 18, and a lower stop 20 secured to a lower surface of flexure member 14 by adhesive 22. Upper magnet 24 has pole pieces 26, one of which is secured to upper stop 16. Lower magnet 28 has pole pieces 30, one of which is secured to lower stop 20. Lower magnet 28 is secured to circuit board 32 which is in turn secured to package 34 which includes electrical connection pins 36. Conductors 33 extend through an opening in upper stop 16 and connect flexure member 14 to pins 36.

The present invention is described in terms of an accelerometer type device for a geophone application. It is to be understood that the present invention applies to other applications requiring a force sensing component or sensing capsule 12.

Figure 2:
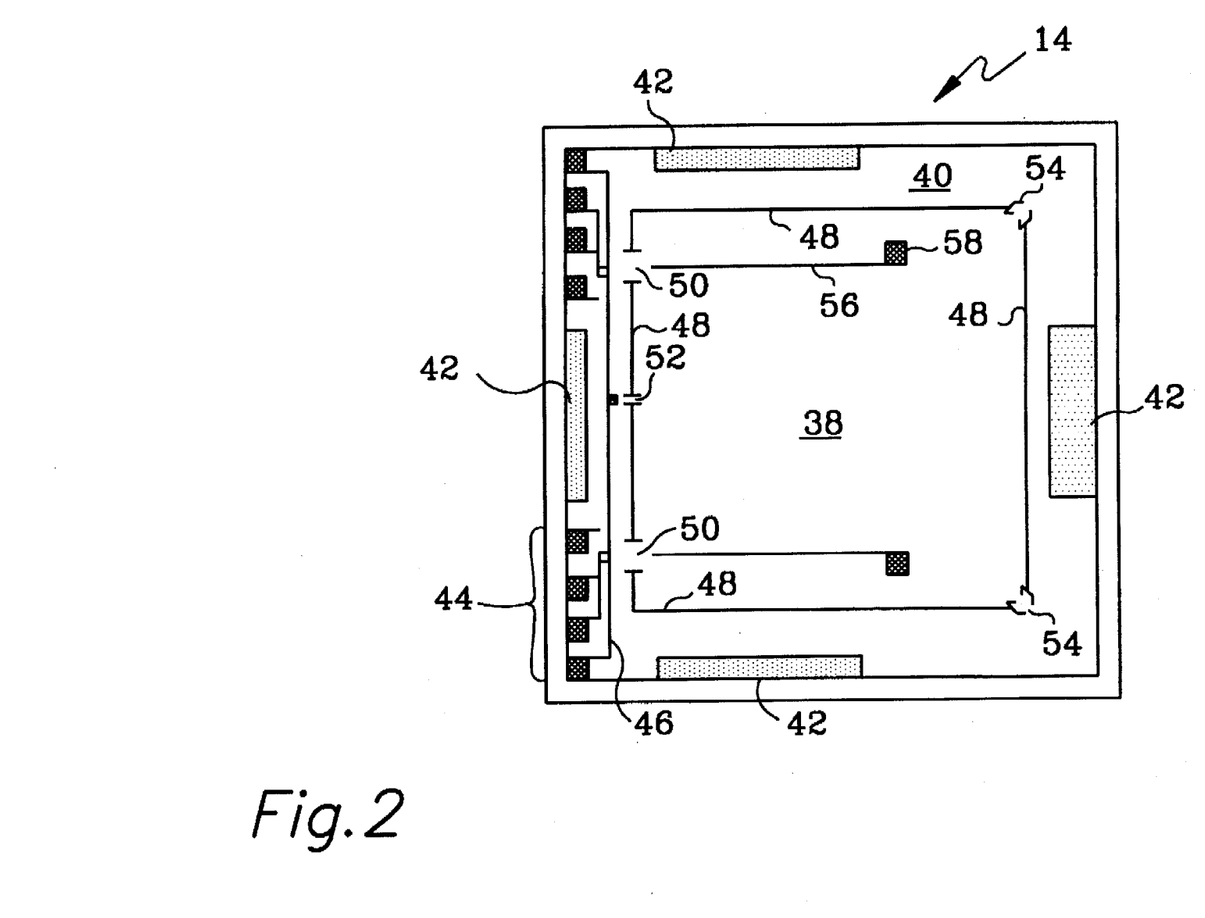
FIGS. 2 through 5 are plan views of portions of the force sensing unit of FIG. 1.

Referring to FIG. 2, a plan view of the upper or front side of flexure member 14 is shown including moveable portion or central proof mass or beam 38, and fixed portion or frame or outer rim 40. Also shown are bonding material locations 42 on rim 40 for securing upper stop 16 to member 14, bonding pads, for example 44 for connection to pins 36 on package 34 and metallization, for example 46. Top side cuts 48 free beam 38 from rim 40 except at struts 50, flexure 52, and support tabs 54. Metallization 56 and bond pads 58 are shown on beam 38. Piezoresistors in a bridge arrangement are located at flexure 52.

Figure 3:
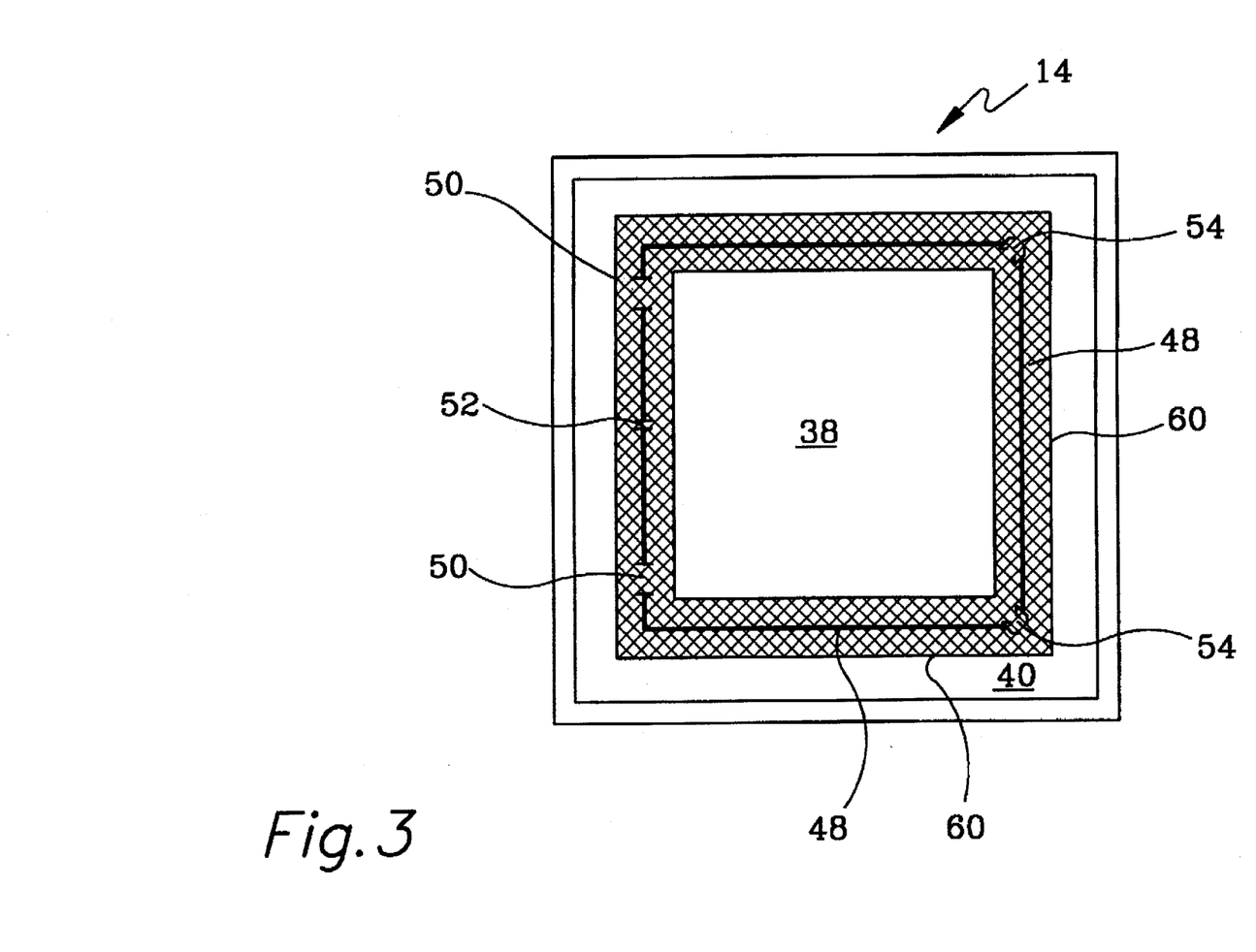

FIG. 3 shows a plan view of the lower or backside of flexure member 14 including backside cuts 60 used to create beam 38, top side cuts 48 used to free beam 38 and supporting tabs 54.

Applications that require high volumes of accelerometer 10 at relatively low cost, e.g., geophone applications, necessitate wafer level processing.

Therefore, sensor capsule 12 is preferably formed by wafer level processing of a flexure member wafer, an upper stop wafer and a lower stop wafer. The upper and lower stop wafers are bonded to the flexure member wafer at individual topside and backside bonding sites respectively. The bonded wafers are then separated into individual sensor capsules 12 by wafer sawing or other known processing techniques.

Tabs 54 support proof mass 38 at its end opposite the end where struts 50 are located. Struts 50 and flexure 52 are extremely thin and fragile. Tabs 54 maintain proof mass 38 in the plane of flexure member 14 and thereby prevent breakage during any wafer processing until such time as upper stop wafer 16 and lower stop wafer 20 have been bonded to flexure member 14.

Figure 7A:
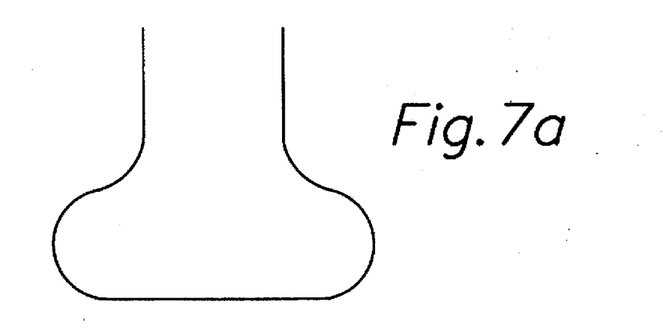
FIGS. 7a and 7b are plan views of certain features of the present invention.

The flexure member wafer may be fabricated using a single crystal p-type wafer with n-type epi. The preferred process uses a silicon on insulator (SOI) wafer with the top layer of silicon isolated from the rest of the epi layer by a thin layer of oxide formed by the well known SIMOX process. The wafer is processed to form the piezoresistive elements 76 using standard IC fabrication techniques. The final steps of this process include deposition and patterning of a metal mask which will be used in a later step to define the top side cuts 48. The wafer is then ground and polished to the appropriate thickness, preferably about 250 micrometers. The backside of the wafer is then patterned and etched to produce the thin web which partially defines the beam 38. This etch is done by standard electrochemical etching processes using anisotropic or isotropic etchants. The preferred process uses isotropic etchants with an applied electrical potential to control the thickness of the web to be proportional to the original thickness of the n-type epi layer. The web thickness for one preferred design is approximately 12 microns. The wafer is then processed with a dry plasma silicon etch through a metal mask which has been previously deposited during the front side wafer processing. This etch process removes silicon from the top side cuts 48 through the entire thickness of the remaining web. The pattern of the top side cut is such that flexures 52, struts 50 and support tabs 54 are left intact. The top side cuts at the edges of flexure 52 and struts 50 are rounded to minimize stress concentration. For example, FIG. 7a shows a greatly enlarged portion of cut 48 at an edge of strut 50, for example an upper edge of strut 50 in FIG. 2. This rounded portion of cut 48 is intended to distribute stress around the juncture of cut 48 with strut 50 to reduce the likelihood of cracks in flexure member 14. In contrast, the top side cuts which define support tabs 54 include sharp points oriented along crystallographic planes to insure that when broken out, support tabs 54 break cleanly.

Figure 7B:
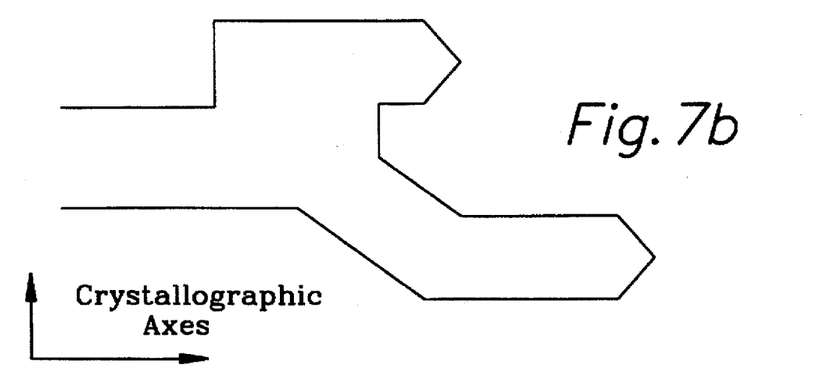

FIG. 7b shows a greatly enlarged portion of top side cuts 48 where it defines one portion of a tab 54. For example, the right hand end of the lower horizontal cut of FIG. 2. The shape in FIG. 7b is intended to create stress along a line emanating from points 72 and 74 in order to cause tab 54 to break cleanly. Without stress concentrating cuts to define tabs 54, unwanted stress can be introduced into flexure member 14 which can lead to the development of cracks which cause changing characteristics, e.g., mass which would alter calibration.

Figure 4:
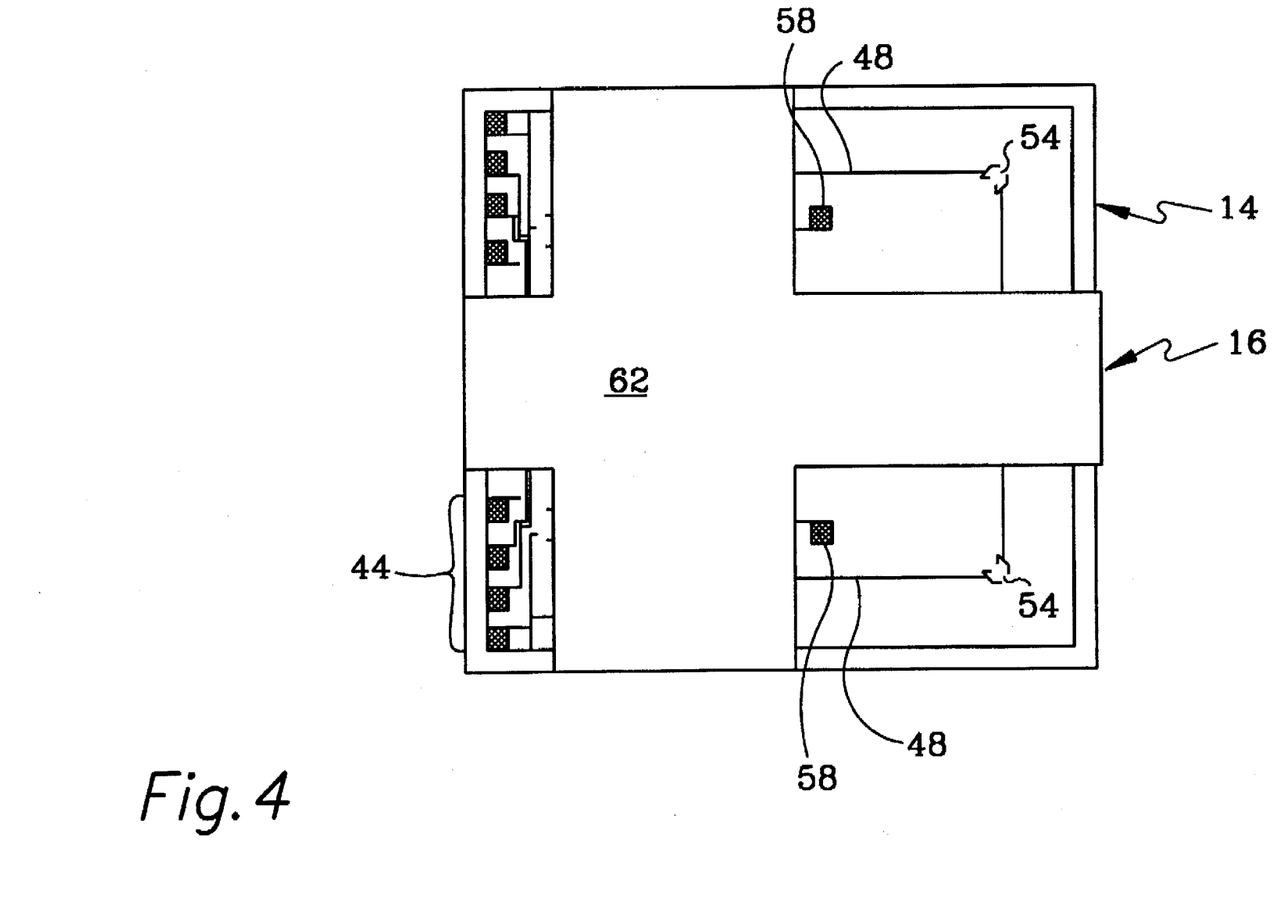

FIG. 4 shows a plan view of upper stop 62 with portions of flexure member 14 visible through holes in upper stop 62. Top side cuts 48, support tabs 54 and bond pads 58 are visible and accessible.

Figure 5:
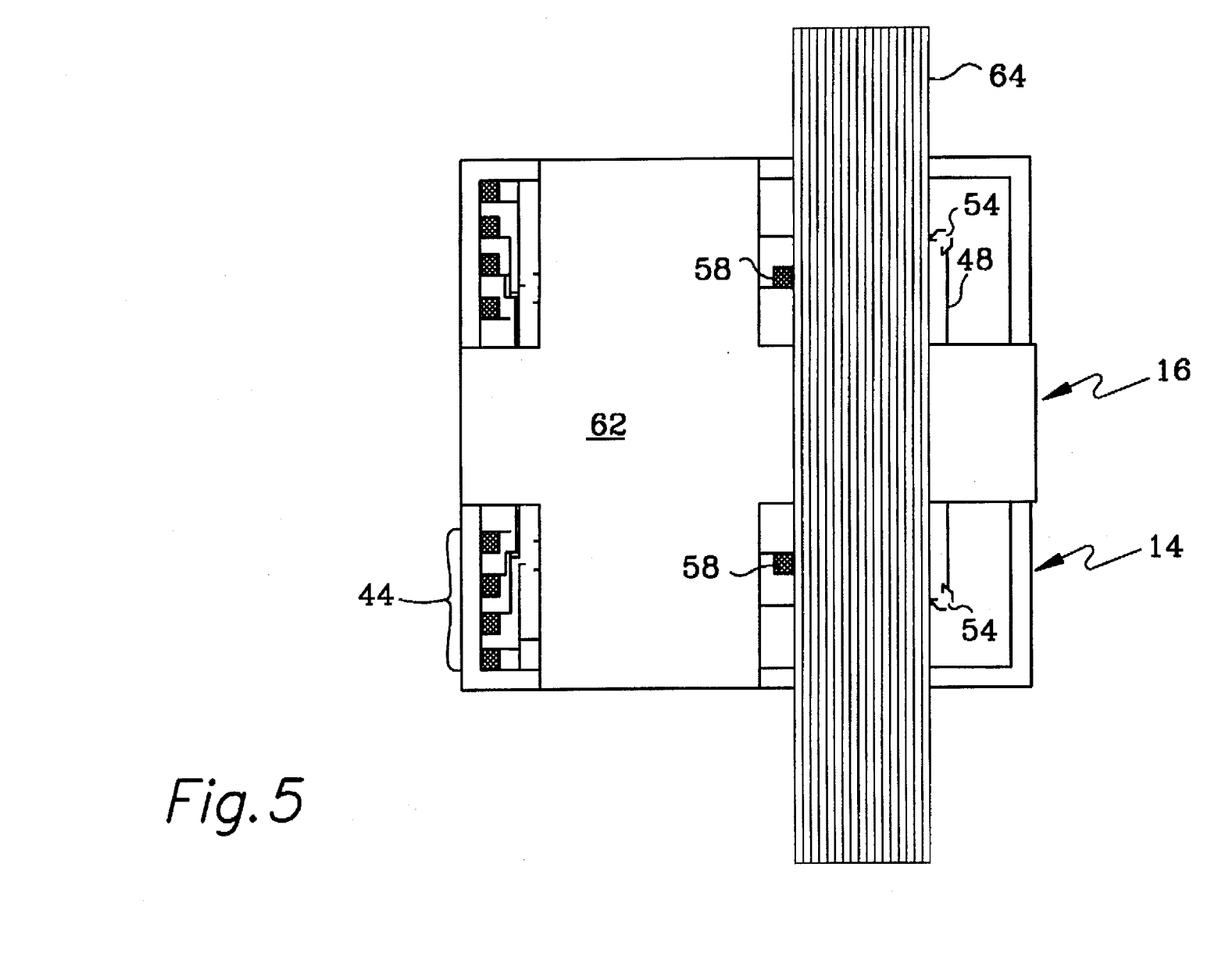

FIG. 5 shows a plan view of upper stop 12 with coil 64 in place. Coil 64, which is wound on a bobbin, is slipped over an end of sensor capsule 12 and surrounds and is carried by beam 38. Coil 64 requires structural connection to flexure member 12 at moveable portion or beam 38 and electrical connection of coil 64 to bonding pads 58. After coil 64 is mechanically secured to beam 38, then according to the principles of the present invention a mechanical force is applied by using a tool at crack initiating features 66 of cuts 48 to cause tabs 54 to cleanly break away or separate from beam 38 and rim 40.

Now that the basic structure of accelerometer 10 has been set forth, additional details will be described.

The flexure member wafer silicon process flow begins with an SOI wafer with n-type epi above and below the oxide, and with a p++ handle wafer. The process includes the following steps:

1. Initial oxide growth
2. Heavy implant photo (mask #1)
3. Leadout oxide etch
4. Leadout implant
5. Pad Photo (mask #2)
6. Pad oxide etch
7. Resistor leadout implant
8. Resistor photo (mask #3)
9. Resistor oxide etch
10. Silicon etch
11. N+ photo (mask #4)
12. N+ oxide etch
13. N+ implant
14. Contact photo (mask #5)
15. Contact oxide etch
16. Contact metal deposition
17. Contact metal etch
18. Pad metal deposition
19. Pad metal photo (mask #6)
20. Pad metal etch
21. Beam release metal deposition
22. Beam release photo (mask #7)
23. Beam release metal etch
24. Backside grind and polish
25. Backside metal deposition
26. Backside cavity (mask #8)
27. Backside metal etch
28. Backside contact photo (mask #9)
29. Cavity etch
30. Front side etch
31. Final wafer clean The upper stop wafer and the lower stop wafer silicon process flow begins with double sided polished wafers with uniform doping. The process includes the following steps:

1. Passivation oxide, nitride growth.
2. Through hole photo
3. Etch nitride oxide
4. Partial silicon etch
5. Adhesion layer deposition
6. Adhesion layer photo
7. Adhesion layer etch
8. Bonding material deposition (solder)
9. Complete silicon etch The wafer bonding process continues with cleaning the three wafers, aligning the wafers, bonding the wafers and sawing the wafers into individual sensor capsules 12.

Figure 6:
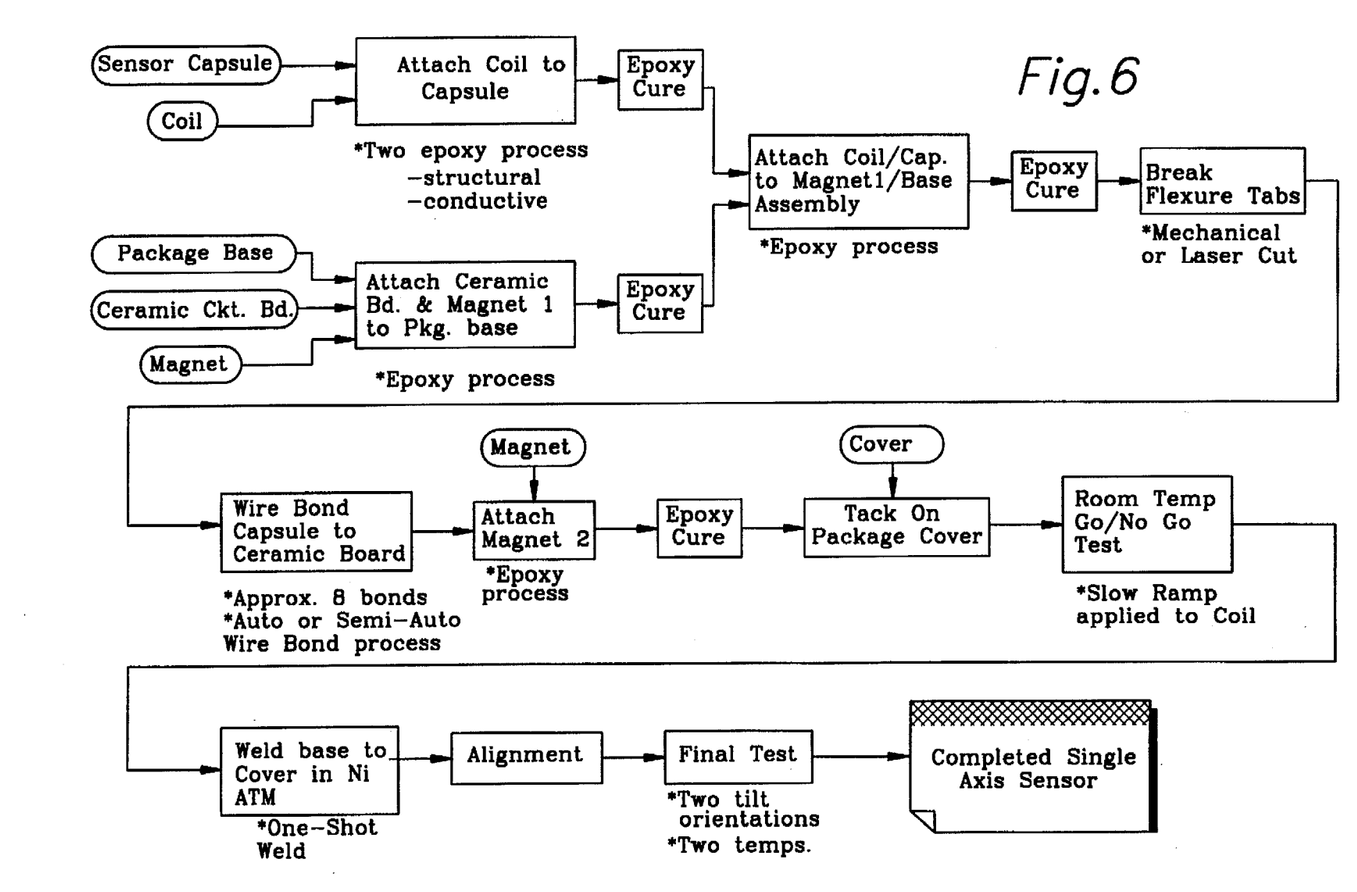
FIG. 6 is a flow diagram of a method of making a force sensing device.

The assembly and test process is outlined in FIG. 6. Coil 64 is attached to sensor capsule 12 using a two-epoxy process. The first epoxy is primarily an electrical contact to coil 64 and the second epoxy is primarily the mechanical contact. In a parallel operation, ceramic circuit board 32 which decouples magnet 28 from package 34 and header are attached.

The assembly of coil 54 and sensor capsule 12 and the assembly of board 32 and header are combined by securing lower stop die 20 to lower magnet 28 with epoxy for example. At this time, proof mass beam 38 is freed by breaking tabs 54 that are holding beam 38 to frame 40.

Figure 8:
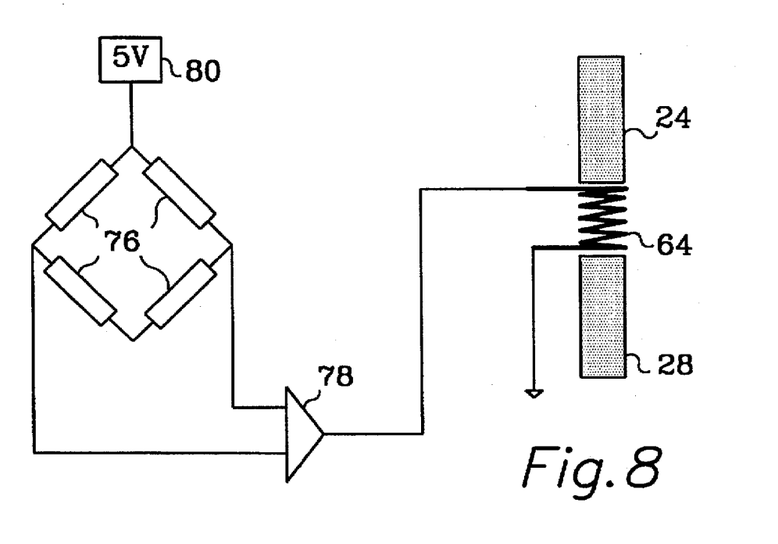
FIG. 8 is a schematic drawing showing certain elements of the present invention.

FIG. 8 shows a simplified schematic of power supply 80 and piezoresistors 76 which are located on flexure 52, upper magnet 24, lower magnet 28 and coil 64. In the embodiment described, the rebalance electronics which would include amplifier 78 would be located outside of package 34, although other arrangements could be used.

In two prototype designs for geophone applications, the following parameters were used:

5 volt design
  beamLength=0.000120M
  beamWidth=0.000362M
  endMass=0.0006 Kg
  massLength=0.0083M
  massBreadth=0.003M
  resistorThickness=3. $10^{-7}$M
  resistorLength=0.000015M
10 volt design
  beamLength=0.000120M
  beamWidth=0.00036M
  endMass=0.0006 Kg massLength=0.004M massBreadth=0.0021M resistorThickness=3.5 $10^{-7}$M resistorLength=0.000015M The assembly process for accelerometer 10, after assembly of sensor capsule 12 is shown in flow diagram form in FIG. 6.

The scope of the invention is to be indicated by the appended claims rather than the foregoing description.

I claim:

1. A force sensing component for use with a force sensing unit comprising:

a planar flexure member having a fixed portion, a moveable portion and a strain sensitive connection between said fixed portion and said moveable portion, said strain sensitive connection providing outputs responsive to a deviation of said moveable portion from a first position;

means for limiting movement of said moveable portion; and at least one removable tab between said fixed portion and said moveable portion, said tab defined by crack initiating features including through cuts along a crystallographic axis of said flexure member.

2. Force sensing component of claim 1 wherein said means for limiting movement comprises an upper stop bonded to a first surface of said flexure member and a lower stop bonded to a second surface of said flexure member, said flexure member, said upper stop, and said lower stop forming a sensor capsule.

3. Force sensing component of claim 1 wherein said crack initiating features comprise through cuts along a crystallographic axis of said flexure member.

4. Force sensing component of claim 3 wherein said through cuts terminate in a point in a direction along said crystallographic axis.

5. Force sensing component of claim 2 wherein said crack initiating features comprise through cuts along a crystallographic axis of said flexure member.

6. Force sensing component of claim 5 wherein said through cuts terminate in a point in a direction along said crystallographic axis.

7. Force sensing component of claim 1 wherein said force sensing unit comprises magnet means secured to said stop means, coil means secured to said moveable portion; and means for receiving said outputs and energizing said coil means in accordance with said outputs to restore said moveable portion to said first position.

8. A force sensing component for use with a force sensing unit comprising:

a flexure member including an inner beam partially separated from an outer frame with a strain sensitive connection between said inner beam and said outer rim, said strain sensitive connection providing outputs responsive to a deviation of said inner beam from a position of mechanical null; and at least one removable interconnecting tab between said inner beam and said outer frame, said tab defined by cuts extending through said flexure member with said cuts aligned along a crystallographic axis of said flexure member.

9. Force sensing component of claim 8 wherein said force sensing unit comprises:

means for mounting said flexure member for acceleration orthogonal to said inner beam;

rebalance coil means secured to said inner beam; and magnetic means carried by said mounting means for cooperating with said coil means; and means for energizing said coil means to restore said inner beam to a position of mechanical null.

* * * * *